United States Patent [19]

Jensen

[11] Patent Number: 4,864,631

[45] Date of Patent: Sep. 5, 1989

[54] OBSTRUCTED-FIELD-INDICIA-SENSING DEVICE

[75] Inventor: James W. Jensen, Boulder, Colo.

[73] Assignee: Adolph Coors Company, Golden, Colo.

[21] Appl. No.: 158,047

[22] Filed: Feb. 16, 1988

Related U.S. Application Data

[63] Continuation of Ser. No. 32,565, Apr. 1, 1987, abandoned, which is a continuation of Ser. No. 667,914, Nov. 2, 1984, abandoned.

[51] Int. Cl.⁴ .............................................. G06K 9/20

[52] U.S. Cl. ...................................... 382/61; 250/548; 250/560; 156/361

[58] Field of Search .................. 382/61; 250/548, 560, 250/561, 559, 571; 156/350, 351, 108, 361; 364/471, 561

[56] References Cited

U.S. PATENT DOCUMENTS

| | | | |
|---|---|---|---|
| 3,439,176 | 4/1969 | Astley et al. | 250/561 |
| 3,439,176 | 4/1969 | Astley et al. | 250/561 |
| 3,446,978 | 5/1969 | Leavens, Jr. | 250/561 |
| 3,582,660 | 6/1971 | Muller-Saala | 250/561 |
| 3,783,293 | 1/1974 | Gold et al. | 250/548 |
| 4,025,025 | 5/1977 | Bartel et al. | 250/548 |
| 4,067,760 | 1/1978 | Nelson | 250/548 |
| 4,248,655 | 2/1981 | Kerwin | 156/351 |
| 4,254,173 | 3/1981 | Peer, Jr. | 428/204 |
| 4,366,372 | 12/1982 | Sargent | 235/92 PL |
| 4,482,972 | 11/1984 | Lewis et al. | 364/561 |
| 4,484,079 | 11/1984 | Betz et al. | 250/548 |
| 4,485,982 | 12/1984 | St. John et al. | 250/560 |
| 4,495,583 | 1/1985 | Punater | 364/471 |
| 4,496,417 | 1/1985 | Haake et al. | 156/550 |
| 4,528,630 | 7/1985 | Sargent | 250/561 |
| 4,549,917 | 10/1985 | Jensen, Jr. | 156/108 |
| 4,572,752 | 2/1986 | Jensen et al. | 156/64 |
| 4,600,841 | 7/1986 | Tokuno et al. | 250/548 |
| 4,644,584 | 2/1987 | Nagashima et al. | 382/34 |

FOREIGN PATENT DOCUMENTS

| | | |
|---|---|---|
| 81112/75 | 5/1975 | Australia . |
| 1413857 | 10/1968 | Fed. Rep. of Germany . |
| 2053283 | 5/1972 | Fed. Rep. of Germany . |
| 2731914 | 1/1979 | Fed. Rep. of Germany . |

*Primary Examiner*—Leo H. Boudreau
*Attorney, Agent, or Firm*—Klaas & Law

[57] ABSTRACT

A method and apparatus for detecting predetermined register indicia on a moving web of material having an obstructing field of indicia positioned about the register indicia.

22 Claims, 5 Drawing Sheets

OBSTRUCTED-FIELD-INDICIA-SENSING DEVICE

This application is a continuation of U.S. Ser. No. 32,565 filed Apr. 1, 1987 now abandoned, which is a continuation of U.S. Ser. No. 667, 914 filed Nov. 2, 1984, now abandoned.

BACKGROUND OF THE INVENTION

The present invention relates generally to indiciasensing apparatus for sensing the relative position of preprinted indicia on a moving web of material and, more particularly, to an indicia-sensing device for detecting predetermined register indicia on a moving film web having an obstructing field of indicia positioned about the register indicia.

The use of composite material in packaging applications has met with a growing acceptance in the past few years because of high strength, low cost, and other characteristics which make it superior to conventional paper board or cardboard in many applications. A typical composite may have a thin layer of plastic film adhered to a relatively thicker layer of paper board material. A method of producing such a composite material is described in U.S. Pat. No. 4,254,173 issued Mar. 3, 1981, for COMPOSITE MATERIAL FOR SECONDARY CONTAINER PACKAGING of A. Dean Peer, Jr., which is hereby incorporated for reference for all that it contains.

During high speed production of composite material such as the type described in the Peer patent, a continuously moving web of paper board material is adhered to a continuously moving web of plastic film material at a relatively high speed. During such high speed laminating operations, the relatively thin plastic web is subject to a number of conditions which may cause it to shrink or expand prior to lamination with the paper board web. Composite material used for packaging may have a repeating set of graphics printed on the plastic film web; and, thus, it is essential to control the stretch or relaxation in the plastic film web in order to provide a composite material having graphics of an exact, predetermined dimension. The method and apparatus for controlling the longitudinal dimension of each repeating set of graphics on a moving film web are described in U.S. patent application Ser. No. 441,276, now U.S. Pat. No. 4,496,417 filed Nov. 12, 1982, for CONTROL STRETCH LAMINATING DEVICE of Haake, Fowler, and Jensen, which is hereby incorporated by reference for all that it contains.

As disclosed in the Haake et al. application, an essential part of a film-stretch-control apparatus is a monitoring device which monitors the passage of certain fixed indicia on the film web which are located at a predetermined position on each repeat length of the film web. The indicia in the Haake et al. application are sensed by high speed photoelectric devices; and a monitoring signal therefrom is processed by a high speed data processing device which also receives a signal indicating the film web velocity and, from these two bits of information, computes the distance between the predetermined indicia. This information is subsequently used to relatively stretch or shrink the film prior to lamination to the paper board in order to provide a composite material having graphics of a precise size and repeat length. The indicia printed on the film web described in Haake et al. move along a photoelectric scanner path which is otherwise free of indicia which would disturb the light beam of the photoelectric scanner, i.e., there are no other indicia positioned on the web as to intersect a straight line drawn between any pair of the length-indicating indicia on the film web.

In many applications wherein a set of graphics occupies the entire width of the film web, such an unobstructed path for the photoelectric sensors cannot be provided without adding an additional width of material which must be subsequently trimmed off the composite web at a significant increase in time and expense.

Thus, it would be desirable to provide a method and apparatus for detecting predetermined indicia within an obstructed field of indicia on a moving film web in order to monitor film web distortion or to provide other data relating to the moving film web. Such apparatus might be used in a similar fashion in any application wherein the recording or registering of predetermined indicia on a moving web is desired and wherein the predetermined indicia are positioned within an obstructing field of indicia.

SUMMARY OF THE INVENTION

The present invention includes an indicia detection apparatus for selectively detecting a predetermined register indicia on a moving web which is positioned within an encompassing field of indicia comprising code indicia having a predetermined pattern and having a spacially fixed relationship on said web relative to said register indicia; indicia sensing means for sensing the spacial configuration of indicia lying along a longitudinally extending, indicia sensing path comprising at least one longitudinally extending, narrow width sensing track and for generating a detection signal indicative of the spacial orientation of indicia in said longitudinally extending, indicia sensing path; data processing means for receiving said indicia detection signal and for comparing said signal with a predetermined set of criteria for detecting a portion of said detection signal corresponding to said code indicia and for selecting a portion of said detection signal for further processing based on the detection of said code indicia and the spacial relationship of said code indicia to said register indicia and for comparing said selected signal portion with a second set of criteria for detecting a portion of said selected signal portion corresponding to said register indicia and registering the detection of said register indicia.

The present invention also includes a method of detecting a predetermined register indicia pattern on a moving web which is positioned within an encompassing field of indicia, a portion of said encompassing field having a predetermined code indicia pattern positioned in predetermined spacial relationship to said register indicia pattern, comprising the steps of continuously monitoring a longitudinally extending code track on said web containing said predetermined code indicia pattern; comparing spacial relationships of indicia detected on said code track during monitoring with a predetermined model corresponding to said code indicia pattern until said code pattern is detected; selecting a short length portion of a longitudinally extending register track on said web containing said register indicia pattern, based upon the detection of said code indicia pattern; monitoring said selected portion of said longitudinally extending register path; comparing spacial indicia patterns detected on said register path with a predetermined model corresponding to said register indicia pattern until said register indicia pattern is detected.

The present invention also includes a method of detecting a predetermined register indicia pattern on a moving web positioned within an encompassing field of indicia, a portion of said encompassing field having a predetermined code indicia pattern, comprising the steps of continuously monitoring the passage of indicia within a longitudinally extending code path with a monitoring unit sensitive to all indicia in said code path, said code path including said code indicia pattern; comparing indicia patterns in said code path with a first set of predetermined criteria corresponding to said code indicia pattern for detecting the passage of said code indicia pattern; monitoring the passage of indicia within a longitudinally extending register path for a predetermined interval with a monitoring unit sensitive to all indicia in said register path, said register path including said register indicia pattern, said predetermined monitoring interval being initiated in response to detecting the passage of said code indicia pattern; comparing the indicia in said register path detected during said predetermined interval with a second predetermined set of criteria corresponding to said register indicia for detecting the passage of said register indicia; and recording the passage of said register indicia.

The present invention also includes a method of detecting a predetermined register indicia pattern on a moving web which is positioned within an encompassing field of indicia, a portion of said encompassing field having a predetermined code indicia pattern, comprising the steps of continuously comparing the indicia in a first longitudinally extending path with first predetermined set of criteria corresponding to characteristics of said code indicia pattern and generating a first signal indicating the passage of each set of indicia meeting said first predetermined set of criteria; continuously comparing the indicia in a second longitudinally extending path with a second predetermined set of criteria corresponding to characteristics of said register indicia pattern and generating a second signal indicating the passage of each set of indicia meeting said second predetermined set of criteria; comparing said first signal with said second signal for detecting the occurrence of a code indicia pattern indication in said first signal and a register indicia pattern indication in said second signal within a predetermined interval; and registering the passage of a register indicia pattern whenever said comparison of signals indicates the occurrence of a register indicia pattern and a code indicia pattern within said predetermined interval.

DETAILED DESCRIPTION OF THE INVENTION

Figure 1:
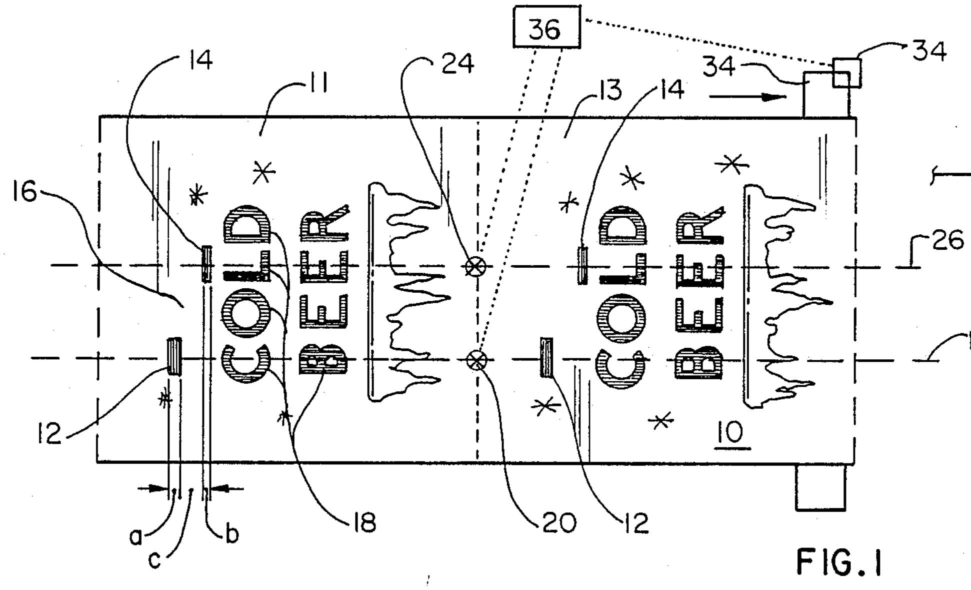
FIG. 1 is a plan view of an indicia detection apparatus being used to detect indicia on a moving film web.
Figure 1A:
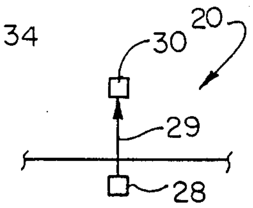
FIG. 1*a* is an elevation view of a portion of FIG. 1.

One preferred embodiment of the invention, which is presently the best mode contemplated, is illustrated in FIG. 1. A moving film web 10 having repeating sets of graphics provided on associated repeating length portions 11, 13 etc. of the web comprises a register indicia pattern positioned at the same relative location within each repeat length 11, 13 etc. In the embodiment illustrated in FIG. 1, the register indicia pattern comprises a single, transversely, extending mark 12 having a dimension measured longitudinally of the web of a predetermined value "a" which may be, for example, one-eighth inch. Each repeat length also has a code indicia pattern positioned at the same relative location within each repeat length. In the embodiment of FIG. 1, the code indicia pattern comprises a single, transversely extending mark 14 having a predetermined, longitudinally measured dimension "b" which may be, for example, one-sixteenth inch. The register indicia pattern 12 and the code indicia pattern 14 within each repeat length are separated by a predetermined, longitudinally measured distance "c". The distance "c" may be, for example, one inch. Other indicia 18, such as, for example, display graphics, quality control graphics, and the like, may also be provided in repeating or random positions within each repeat length 11, 13, etc. A first indicia sensing means, which in the embodiment of FIG. 1 comprises a register photoelectric sensor 20, is positioned at a fixed location relative to the moving film web whereat a relatively narrow width track 2 that is scanned by the photoelectric sensor 20 intersects a register indicia 12 on each succeeding repeat length 11, 13 etc. as the film web 10 progresses in the direction indicated (from left to right on the sheet of drawing). As illustrated in FIG. 1*a*, the register photoelectric sensor 20 may comprise a conventional photoelectric sensor including a light source 28 positioned below the moving film web 10 for directing a narrow beam of light 29 through the film web to a light sensor 30. The light sensor 30 generates a signal based upon the presence or absence of light from the light beam 29 which is periodically obstructed by the printed indicia on the film web 10. Thus, a time based signal is generated which, when compared with a film velocity based signal, may be used to determine the exact location and longitudinal dimension of indicia passing through the light beam, i.e., indicia positioned along path 22. A film velocity based signal may be generated by a conventional encoder 32 or "roto-pulsor" of the type described in the Haake et al. U.S. patent application Ser. No. 441,276 filed Nov. 12, 1982. The encoder 32 may be mounted to rollingly contact a roll 34 having a surface speed equal to that of the film web 10. Both the encoder 32 speed based signal and the time based signals from the photoelectric sensor 20, 24 are received and processed by a processing means such as a conventional microprocessor 36 of the type described in Haake et al. U.S. patent application Ser. No. 441,276 filed Nov. 12, 1982. It is an important feature of the present invention that indicia other than the register indicia 12 may be present along path 22 without affecting the accuracy or operation of the apparatus.

A second indicia sensing means in the embodiment of FIG. 1 comprises a code photoelectric sensor 24 which may be of identical construction to the register photoelectric sensor 20 and which senses all indicia positioned along a longitudinally extending, code sensing track 26 parallel to the register sensing track 22. Code photoelectric sensor 24 is positioned so as to intersect each code indicia pattern 14 on the moving film web. Thus, the two photoelectric sensors 20, 24 comprise an indicia sensing means for sensing the spacial characteristics of indicia lying within a longitudinally extending, indicia sensing path which, in turn, comprises the register sensing track 22 and the code sensing track 26.

Figure 5:
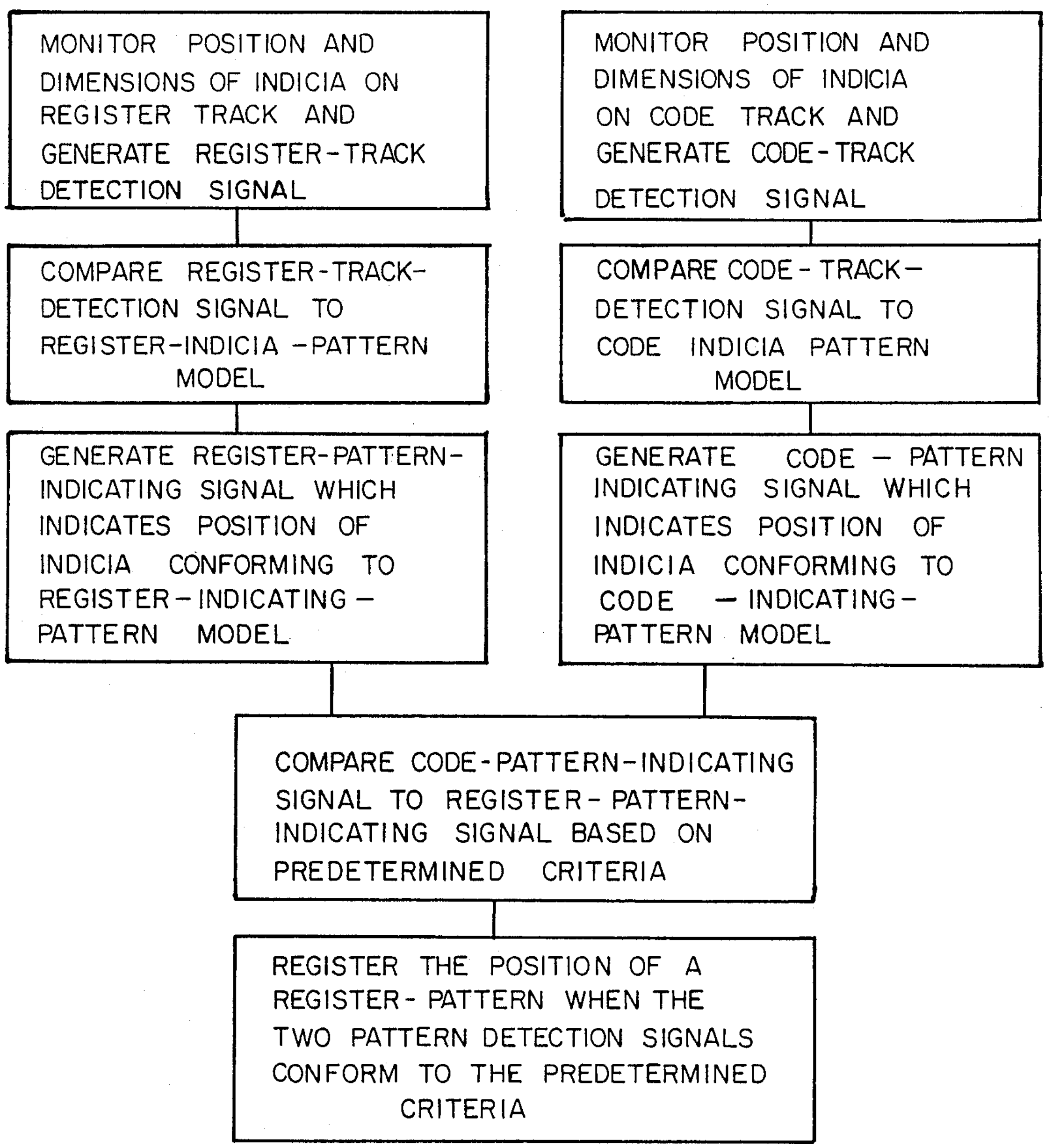
FIG. 5 is a flow chart of one method of operating a detection apparatus for detecting predetermined indicia in an obstructed field.

One method of utilizing the apparatus shown in FIG. 1 to cause exclusive registration of the passage of register indicia patterns such as mark 12 is illustrated in FIG. 5. Photoelectric sensor 20 continuously monitors the passage of all indicia along code track 22 providing information regarding the longitudinal dimension of each set of indicia sensed and also the longitudinal spacing between the sensed indicia in a code-track-indicia-detection signal. Photoelectric sensor 24 simultaneously monitors the passage of all indicia along code track 26 and provides information regarding the longitudinal dimension and spacing of the indicia in a code-track-indicia-detection signal. Next, each of the two indicia indicating signals is compared with a predetermined mathematical model. This model may consist, with respect to the register track detection signal, of the criteria that the indicia being examined must have a longitudinal dimension falling within a predetermined value range, e.g., the criteria may be that the indicia must have a dimension less than 1.1a and greater than 0.9a. With respect to the code-track-detection signal, the criteria may be that the indicia must have a dimension less than 1.1b and greater than 0.9b. By providing such tolerances mark irregularities which may be produced by variations in mark printing conditions will not effect the accuracy of the monitoring apparatus. A second set of signals is provided in response to each of these comparisons of the first set of signals with the respective mathematical models. The second set of signals generated indicates the relative position of indicia patterns conforming to the register indicia model in the case of one signal and to the code indicia model in the case of the other signal. The second set of signals, i.e., the two pattern detection signals, is then compared. If a portion of the code-pattern-detection signal indicating the occurrence of a code pattern and a portion of the register-pattern-detection detection signal indicating the occurrence of a register pattern both occur within a predetermined time span, i.e., in physical terms, if the code mark 12 and the register mark 14 are detected within a predetermined distance of each other, the relative position of the detected-register-indicia pattern is recorded, i.e., registered for further processing.

Thus, it may be seen from the foregoing example that three sets of criteria must be satisfied before a mark detected by the photosensor 20 is recorded as a register indicia:

1. The mark must meet certain predetermined criteria regarding its longitudinal positioning. (In the preceding example, it must have a longitudinal dimension within 10 percent of the value of "a".)

2. The mark must be within a predetermined longitudinal distance from a detected code mark.

3. The code mark must have been found to meet certain predetermined characteristics. (In the preceding example, it must have a longitudinally measured dimension within 10 percent of the value "b".)

The probability of all three criteria being met simultaneously in a random occurrence is extremely low; and, thus, the statistical probability of the apparatus recording only the proper register marks 12 is extremely high.

Figure 2:
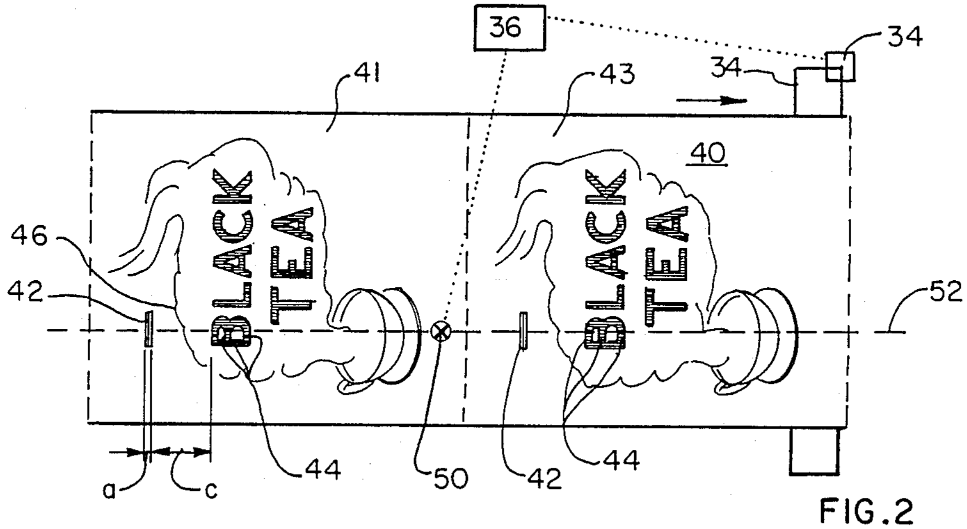
FIG. 2 is another embodiment of an indicia detection apparatus.
Figure 3:
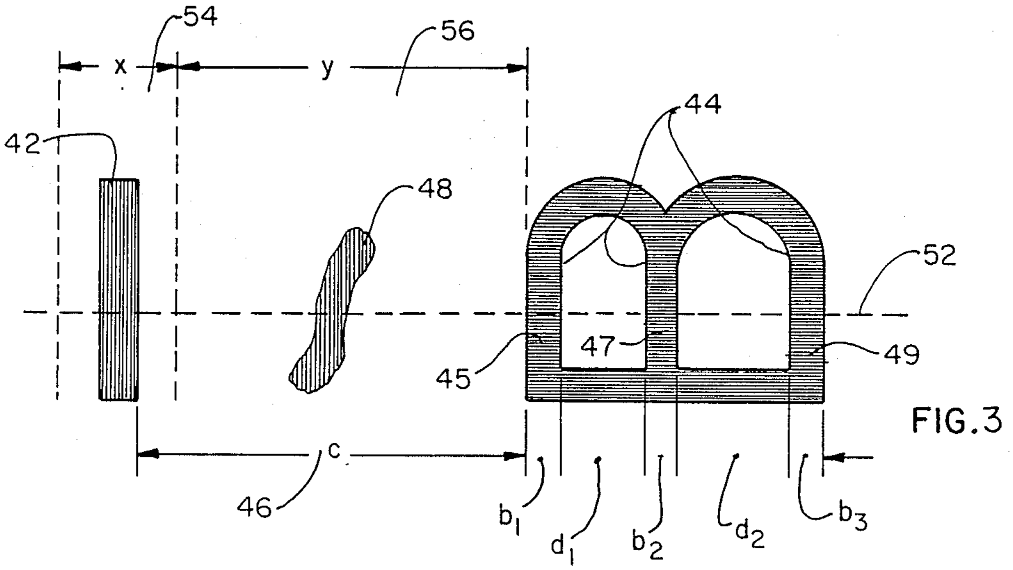
FIG. 3 is a detail of a portion of the moving web shown in FIG. 2.

Referring now to FIG. 2, it may be seen that, in another embodiment of the invention, a film web 40 having repeat lengths 41, 43 etc. is provided with a register indicia pattern which may be a single mark 42 having a longitudinally measured dimension "a". The web is also provided with a code-indicia pattern 44 which, in the illustrations of FIGS. 2 and 3, comprises three bar portions 45, 47, 49 of the letter "B". The bars have longitudinally measured dimensions of $b_1$, $b_2$, $b_3$, respectively, and are separated by longitudinally measured distances of $d_1$, $d_2$, respectively. In this illustration, the register indicia pattern 42 and the code indicia pattern 44 are positioned so as to be intersected by a single, narrow-width-scanning track 52 of a photoelectric sensor 50 which may be of an identical construction to photosensor 20 described with reference to FIG. 1*a*. The code indicia pattern and the register indicia pattern are separated by a distance "c". A randomly positioned indicia 48 from the surrounding indicia field may lie along path 52 between the register indicia pattern 42 and the code indicia pattern 44. A register-indicia-pattern window 54 having a longitudinally measured dimension "x" is provided in a longitudinally bracketing relationship about the register indicia pattern 42 as will be described in further detail hereinafter. The register window 54 may begin at a distance "y" from the upstream edge of the code indicia pattern 44. The gap between patterns 42, 44 is here designated by the numeral 56.

Figure 6:
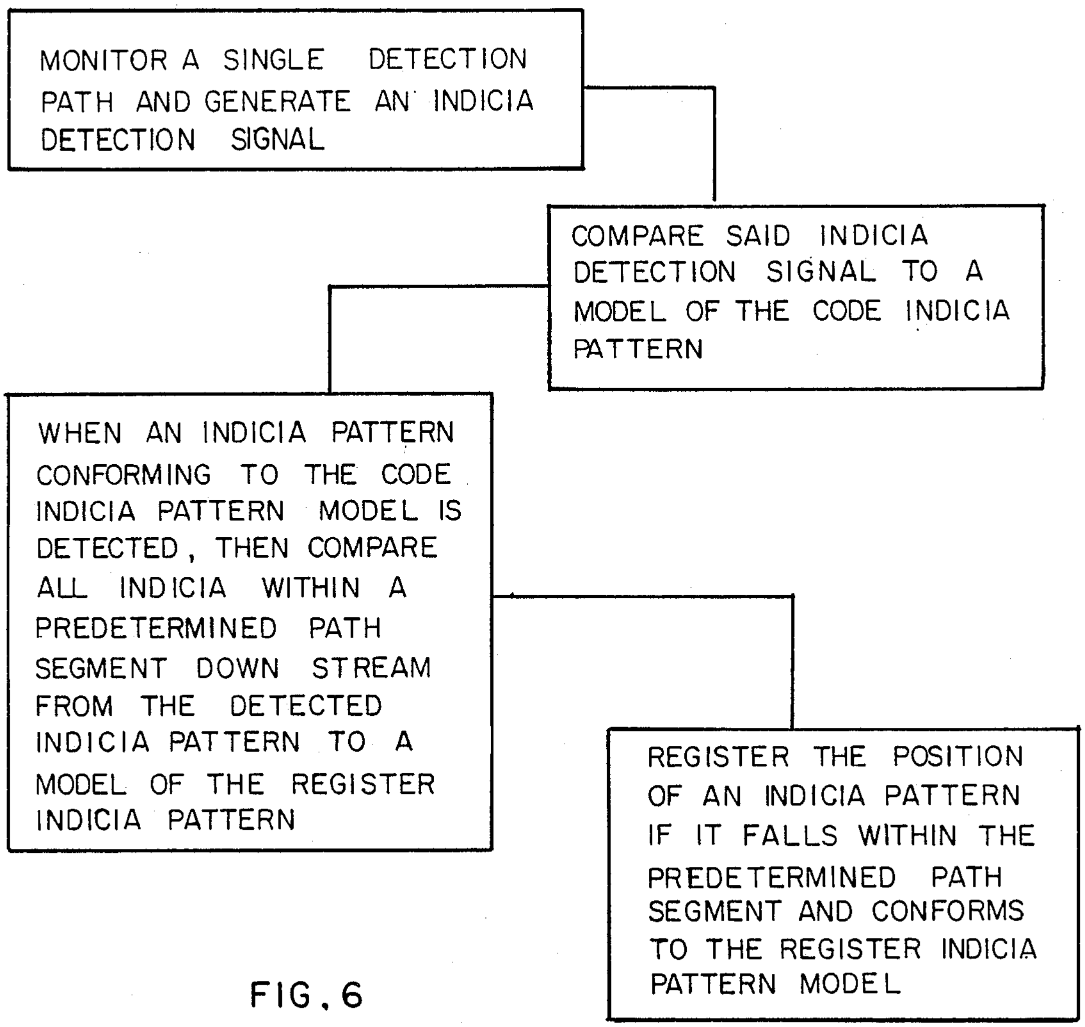
FIG. 6 is a flow chart of another method of operating a detection apparatus for detecting predetermined indicia in an obstructed field.

As illustrated by FIG. 6, the indicia monitoring apparatus of FIG. 2 operates by continuously monitoring a single detection path 52 and generating an indicia detection signal containing information as to the longitudinal dimension and longitudinal spacing of indicia detected by the photoelectric sensor 50.

Next, the indicia detection signal is compared with a mathematical model of the code indicia pattern 44. In this particular embodiment, the mathematical model consists of information including the longitudinal dimensions of each set of indicia sensed and also the distance between indicia sensed. Thus, for example, the mathematical model could require that the three indicia separated by distances equal to plus or minus 10 percent of $d_1$ with respect to the first distance and plus or minus $d_2$ with respect to the second distance be detected and, further, that the dimensions of the three indicia detected lie within the values $0.9b_1$ to $1.1b_1$, $0.9b_2$ to $1.1b_2$ and $0.9b_3$ to $1.1b_3$, respectively. After an indicia pattern conforming to the code-indicia-pattern model is detected, all indicia within a predetermined window 54 positioned a predetermined distance "y" downstream of the detected-code-indicia pattern are compared with a second mathematical model corresponding to the register indicia pattern. In this case, this may consist of the single criterion that the longitudinal dimension be within 10 percent of the value "a". If the indicia sensed within the window 54 conform to this value, they are then registered for further processing.

Figure 4:
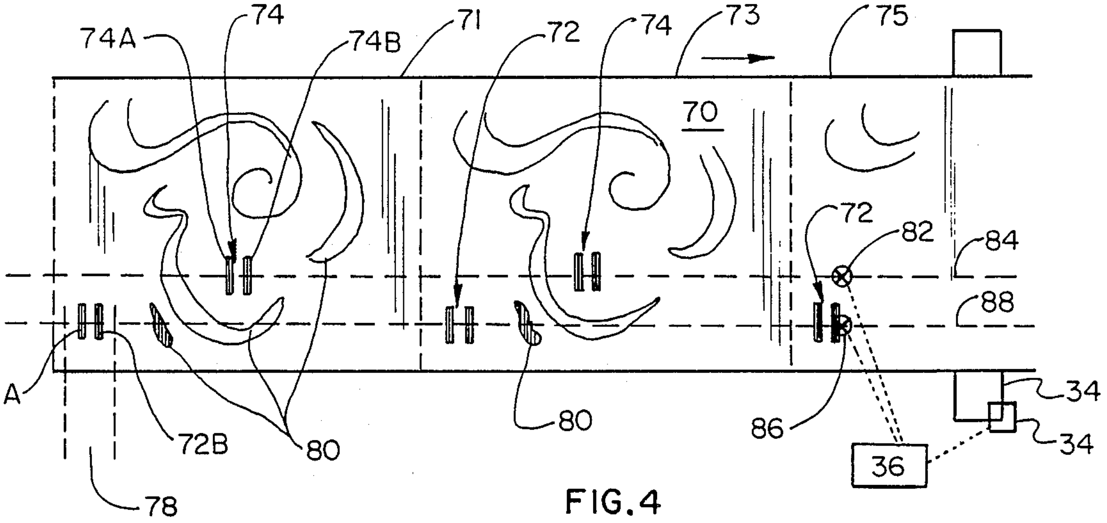
FIG. 4 is another embodiment of an indicia detection apparatus.
Figure 7:
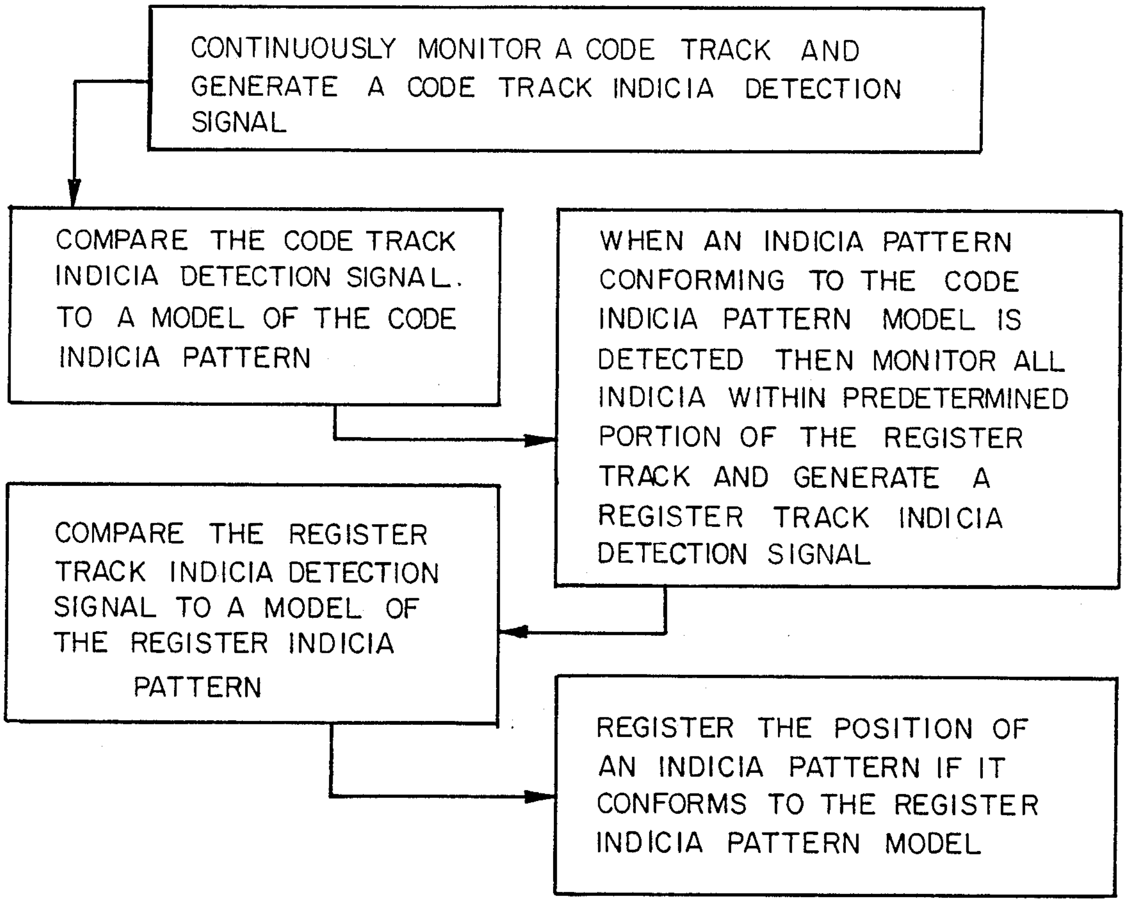
FIG. 7 is a flow chart of another method of operating a detection apparatus for detecting predetermined indicia in an obstructed field.

As illustrated by FIG. 4 in another embodiment of the invention, a moving film web 70 is provided with a series of register indicia patterns 72 at predetermined positions within repeat lengths 71, 73, 75, etc. Each register indicia pattern 72 has an associated code indicia pattern 74 position in longitudinally and transversely spaced-apart relationship from the register indicia pattern. The register indicia pattern 72 may comprise two marks 72A, 72B, each having a predetermined longitudinal dimension separated by a predetermined longitudinal distance. Each of the code indicia patterns may also comprise two marks 74A, 74B having predetermined longitudinal dimensions and spacing. The register indicia pattern 72 is separated from the code indicia pattern 74 longitudinally by a predetermined distance. A register indicia window 78, as described in further detail below, brackets the register indicia 72 and is positioned at a predetermined longitudinal distance from the code indicia pattern 74. Surrounding field indicia 80 may be positioned within the code sensing track 84 or register sensing track 89 defined by photoelectric code sensor 82 and photoelectric register 86, respectively. In this embodiment as illustrated in FIG. 7, the sequence of operations leading to registering of indicia pattern 72 may begin with continuously monitoring code track 84 and generating a code-track-indicia-detection signal. The code-track-indicia-detection signal is then compared with a model of the code indicia pattern based on criteria of, e.g., the dimensions of marks 74A, 74B, and the spacing therebetween. When a set of indicia is found to conform to this predetermined set of criteria, a command signal is generated to activate photosensor 86 at a predetermined longitudinal distance from the point of detection of the code indicia pattern. The photosensor 86 monitors only a small length predetermined portion of path 88 before it is switched off providing an indicia detecting signal. Indicia detected are compared with a second mathematical model with predetermined criteria based on the characteristics of the of the register indicia, e.g., number of marks, spacing between marks, mark dimensions. If the indicia detected by photoelectric sensor 86 conform to the mathematical model, then the position where this indicia pattern occurred is registered.

It is contemplated that the inventive concepts herein described may be variously otherwise embodied and it is intended that the appended claims be construed to include alternative embodiments of the invention except insofar as limited by the prior art.

What is claimed is:

1. A method of monitoring the relative portion of preselected portions of a web of material of the type having aligned, substantially identical repeating graphics patterns thereon extending across the entire width of the web and repeating in approximately equal repeat length intervals along the length of the web, wherein each repeating graphics pattern comprises a plurality of repeating, longitudinally spaced apart graphics portions lying entirely within a narrow width path extending longitudinally of the web wherein said plurality of graphics portions are longitudinally spaced apart at substantially different distances from one another and wherein said narrow width path also includes randomly occurring and randomly spaced indicia, comprising the steps of:

(a) using a selected repeating portions of said repeating graphics portions as a register indicia;
(b) using at least one selected repeating other portion of said repeating graphics portions as code indicia;
(c) continuously sensing the passage of every indicia in said narrow width longitudinally extending path which includes said register indicia and said code indicia and generating an indicia detection signal indicative of the passage of all indicia in said indicia detection path;
(d) analyzing said indicia detection signal base upon a first set of criteria associated with said code indicia until detecting a portion of said indicia detection signal which corresponds to said code indicia;
(e) using said detected portion of said signal which corresponds to said code indicia as a reference point, further analyzing said detection signal based upon a second set of criteria associated with said register indicia to determine the portion of said detection signal which corresponds to said register indicia.

2. The method of claim 1 wherein the step of analyzing the indicia portion signal based upon a first set of criteria includes using the longitudinal distance between code indicia as criterion.

3. The method of claim 1 wherein the step of analyzing the indicia detection signal based upon a first set of criteria includes using the longitudinal dimensions of code indicia as a criterion.

4. The method of claim 1 wherein the step of analyzing the indicia detection signal based upon a first set of criteria includes using the number of code indicia detected within a predetermined distance of web travel as a criterion.

5. The method of claim 1 wherein the step of using said detected portion of said signal which conforms to said code indicia as a reference point, further analyzing said detection signal base upon a second set of criteria to determine the portion of said detection signal which corresponds to the passage of a register indicia comprises analyzing a portion of the detection signal occurring in a predetermined spacial relationship with the detected code indicia and selecting the first occurring indicia therein as a register indicia.

6. The method of claim 1 wherein the step of using said detection portion of said signal which conforms to said code indicia as a reference point, further analyzing said detection signal based upon a second set of criteria to determine the portion of said detection signal which corresponds to the passage of a register indicia comprises analyzing a portion of the detection signal occurring in a predetermined spacial relationship with said code indicia for detecting the occurrence of an indicia configuration which includes said register indicia.

7. The method of claim 6 comprising the step of further analyzing said detected indicia configuration based upon the spacial relationship of indicia occurring therein for determining the location of the signal portion therein corresponding to said register indicia.

8. The method of claim 1 wherein the step of further analyzing said detection signal based upon a second set of criteria includes using the longitudinal distance between indicia in said selected signal portion as a criterion.

9. The method of claim 1 wherein the step of further analyzing the indicia detection signal based upon a second set of criteria includes using the longitudinal dimensions of indicia in said selected signal portion as a criterion.

10. A method of monitoring the relative portion of preselected portions of a web of material of the type having aligned, substantially identical repeating graphics patterns thereon extending across the entire width of the web and occurring in approximately equal repeat length intervals along the length of the web, wherein each repeating graphics pattern comprises a plurality of repeating graphics portions which are longitudinally spaced apart at substantially different distances from one another and wherein said narrow width path also includes randomly occurring and randomly spaced indicia, comprising the steps of:

(a) using one selected repeating portion of said repeating graphics portions as a register indicia;

(b) using at least one selected repeating portion of said repeating graphics which lies in a different narrow width sensing path from said register indicia and which have a first indicia pattern as first code indicia;

(c) using at least one selected repeating portion of said repeating graphics portions which lie in a common narrow width sensing path with said register indicia and which have a second indicia pattern as second code indicia;

(d) continuously sensing the passage of every indicia in a first longitudinally extending indicia detection path which includes said first code indicia and generating a first indicia detection signal representative thereof;

(e) continuously sensing the passage of every indicia in a second longitudinally extending indicia detection path which includes said repeating register indicia and said second code of indicia and generating a second indicia detection signal representative thereof;

(f) analyzing said first indicia detection signal based upon a first set of criteria until detecting a portion thereof which conforms to said first indicia pattern;

(g) analyzing said second indicia detection signal based upon a second set of criteria until detecting a portion thereof which conforms to said second indicia pattern;

(h) comparing the relationship between the occurrence of an indicia pattern in said first signal conforming to said first indicia pattern and the occurrence of an indicia pattern in said second signal conforming to said second indicia pattern with a predetermined standard;

(i) upon finding indicia pattern occurrences conforming to said predetermined standard, further analyzing said second indicia detection signal using the detected occurrence of indicia conforming to said predetermined second indicia pattern as a reference position to determine the portion of said second detection signal which corresponds to the passage of a register indicia.

11. The invention of claim 10 wherein at least one of said criteria of said first and second sets of criteria comprise:

the distance between indicia.

12. The invention of claim 10 wherein at least one of said criteria of said first and second sets of criteria comprise:

the longitudinal dimension of indicia.

13. The invention of claim 10 wherein at least one of said criteria of said first and second sets of criteria comprise:

the number of indicia occurring within a predetermined distance.

14. The invention of claim 10 wherein said predetermined standard comprises a predetermined longitudinal distance between said first and second signal portions.

15. A method according of monitoring the relative position of preselected portions of a web of material of the type having aligned, substantially identical repeating graphics patterns thereon extending across the entire width of the web and occurring in approximately equal repeat length intervals along the length of the web, wherein each repeating graphics pattern comprises a plurality of repeating graphics portions which are longitudinally spaced apart at substantially different distances from one another, comprising the steps of:

(a) using one selected repeating portion of said repeating graphics portions as a register indicia;

(b) using at least one selected repeating portion of said repeating graphics which lies in a different narrow width sensing path from said register indicia and which have a first indicia pattern as first code indicia;

(c) using at least one selected repeating portion of said repeating graphics portions which lie in a common narrow width sensing path with said register indicia and which have a second indicia pattern as second code indicia;

(d) continuously sensing the passage of every indicia in a first longitudinally extending indicia detection path which includes said repeating first set of indicia and generating a first indicia detection signal representative thereof;

(e) analyzing said first indicia detection signal based upon a first set of criteria until detecting a portion thereof which conforms to said predetermined first indicia pattern;

(f) upon detecting a portion of said first detection signal conforming to said predetermined first indicia pattern and using that detected signal portion as a reference position continuously sensing the passage of all indicia in said second detection path for a preset duration;

(g) analyzing said second indicia detection signal based upon a second set of criteria for conformance of a portion of said second signal to said second predetermined indicia pattern;

(h) upon detecting a portion of said second signal conforming to said second predetermined indicia pattern further analyzing said detected signal portion of determine the portion thereof which corresponds to a register indicia.

16. The invention of claim 15 wherein at least one of said criteria of said first and second sets of criteria comprise:

the distance between indicia.

17. The invention of claim 15 wherein at least one of said criteria of said first and second sets of criteria comprise:

the longitudinal dimension of indicia.

18. The invention of claim 15 wherein at least one of said criteria of said first and second sets of criteria comprise:

the number of indicia occurring within a predetermined distance.

19. A method of monitoring the relative portion of preselected portions of a web of material of the type having aligned, substantially identical repeating graphics patterns thereon extending across the entire width of the web and occurring in approximately equal repeat length intervals along the length of the web, wherein each repeating graphics pattern comprises a plurality of repeating, longitudinally spaced apart graphics portions lying extending within a narrow width path extending longitudinally of the web wherein said plurality of graphics portions are longitudinally spaced apart at substantially different distances from one another and wherein said narrow width path also includes randomly occurring and randomly spaced indicia, comprising the steps of:

(a) designating a selected repeating portion of said repeating graphics portions as a register indicia;

(b) designating at least one other selected repeating portion of said repeating graphics portions having a first indicia pattern as first code indicia;

(c) designating at least one other of said repeating graphics portions having a second indicia pattern as second code indicia;

(d) initially detecting every indicia in a single narrow width detection path including said first and second code indicia and said register indicia and generating a detection signal representative thereof;

(e) analyzing said detection signal based upon a first set of criteria until detecting a portion thereof which conforms to said first indicia pattern;

(f) interrupting the detection of indicia for a predetermined interval;

(g) resuming detection of every indicia in said narrow width detection path and resuming generation of a signal representative thereof;

(h) analyzing said resumed detection signal based upon a second set of criteria for selecting a portion thereof representative of said register indicia.

20. The invention of claim 19 wherein at least one of said criteria of said first and second sets of criteria comprise:

the distance between indicia.

21. The invention of claim 19 wherein at least one of said criteria of said first and second sets of criteria comprise:

the longitudinal dimension of indicia.

22. The invention of claim 19 wherein at least one of said criteria of said first and second sets of criteria comprise:

the number of indicia occurring within a predetermined distance.

* * * * *

UNITED STATES PATENT AND TRADEMARK OFFICE
CERTIFICATE OF CORRECTION

PATENT NO. : 4,864,631

DATED : September 5, 1989

INVENTOR(S) : James W. Jensen

It is certified that error appears in the above-identified patent and that said Letters Patent is hereby corrected as shown below:

Column 4, line 35, "2" should read --22--.

In the Claims:

Claim 1, Column 7, line 44, "portion" should read --position--.
Claim 10, Column 8, line 60, "portion" should read --position--.
Claim 15, Column 9, line 64, delete "according"; and
Column 10, line 41, "of should read --to--.
Claim 19, Column 10, line 56, "portion" should read --position--; and
line 64, "extending" (first Occurrence) should read --entirely--.

Signed and Sealed this

Third Day of July, 1990

*Attest:*

HARRY F. MANBECK, JR.

*Attesting Officer* *Commissioner of Patents and Trademarks*